United States Patent
Milone

(10) Patent No.: US 8,776,595 B2
(45) Date of Patent: Jul. 15, 2014

(54) TEMPERATURE COMPENSATED HYDROSTATIC LIQUID LEVEL SENSOR

(76) Inventor: Christopher J. Milone, Sewell, NJ (US)

( * ) Notice: Subject to any disclaimer, the term of this patent is extended or adjusted under 35 U.S.C. 154(b) by 340 days.

(21) Appl. No.: 13/385,763

(22) Filed: Mar. 6, 2012

(65) Prior Publication Data

US 2013/0233072 A1    Sep. 12, 2013

(51) Int. Cl.
*G01F 23/24* (2006.01)

(52) U.S. Cl.
USPC ..... 73/304 C; 73/290 B; 73/290 R; 73/290 V

(58) Field of Classification Search
CPC ... C02F 2209/42; G01F 23/26; G01F 23/268; G01F 23/00; G01F 23/24; G01F 23/243; G01F 23/14; G01F 23/263; G01F 23/2967; G01F 23/74
USPC .......... 73/290 B, 290 R, 290 V, 304 C, 304 R
See application file for complete search history.

(56) References Cited

U.S. PATENT DOCUMENTS

| | | | | |
|---|---|---|---|---|
| 3,350,940 A | * | 11/1967 | Stone | 73/301 |
| 3,513,701 A | * | 5/1970 | Soltanoff | 73/301 |
| 4,417,473 A | | 11/1983 | Tward et al. | |
| 4,637,254 A | * | 1/1987 | Dyben et al. | 73/314 |
| 4,756,076 A | | 7/1988 | Dyban | |
| 4,779,460 A | * | 10/1988 | Cruickshank | 73/313 |
| 5,050,431 A | * | 9/1991 | McDonald | 73/304 C |
| 5,051,921 A | * | 9/1991 | Paglione | 702/52 |
| 6,098,457 A | * | 8/2000 | Poole | 73/295 |
| 6,186,001 B1 | * | 2/2001 | Baker | 73/304 C |
| 6,490,920 B1 | * | 12/2002 | Netzer | 73/304 C |
| 7,258,005 B2 | * | 8/2007 | Nyce | 73/304 C |
| 2001/0000851 A1 | * | 5/2001 | Morimoto | 73/304 C |
| 2005/0229700 A1 | * | 10/2005 | Chai et al. | 73/304 R |
| 2006/0156809 A1 | * | 7/2006 | Immel | 73/304 R |
| 2008/0134779 A1 | * | 6/2008 | Tung et al. | 73/304 |
| 2008/0156092 A1 | * | 7/2008 | Boiarski | 73/304 R |

* cited by examiner

*Primary Examiner* — David A Rogers
(74) *Attorney, Agent, or Firm* — Robert Nathans

(57) ABSTRACT

An outer passive reference resistor loop is printed along the length of an elongated substrate along with an inner active liquid level sensing resistor loop, whereby the reference resistor loop is exposed to exactly the same varying temperature conditions as the active level sensing resistor loop (e.g. in half air/half water), thereby providing superior temperature compensation. An upper plastic substrate carries a elongated conductive strip that is positioned over the first and second legs of the inner resistor loop but not over the legs of the outer resistor loop and wherein the first and second insulated substrates are coupled together providing separation of the substrates in the absence of hydrostatic pressure, and for causing conductive bridging contact by the elongated strip of an electrically conductive material contacting the first and second legs of the inner resistive elongated loop in the presence of hydrostatic pressure. Printed inks produce the resistive loops.

22 Claims, 3 Drawing Sheets

TEMPERATURE COMPENSATED HYDROSTATIC LIQUID LEVEL SENSOR

BACKGROUND OF THE INVENTION

My U.S. Pat. No. 7,661,307 to Milone, incorporated by reference herein, discloses a low manufacturing cost printed ink liquid level tape sensor having first and second elongated flexible insulated substrates having patterns of resistive liquid level sensor sections along the substrate lengths, each pattern comprising printable resistive ink of the same resistivity (ohms-squared), wherein the patterns can be simultaneously printed upon each substrate to save manufacturing costs. The substrates can be separated by an elongated spacer that couples longitudinal edges of the facing substrates together with an appropriate adhesive. Alternatively, the facing substrates can be folded along a central fold line to form a first longitudinal edge and adhesively joined along a second longitudinal edge opposite the first longitudinal edge. The flexibility of the very thin substrates enables the low manufacturing cost liquid level sensors to be positioned in, for example, a highly irregularly shaped vehicle fuel tank. Also, sections of varying lengths that can be very long, e.g. 100 feet, to be cut from the rolls on demand by users to form customized lengths of liquid level sensors for numerous applications.

However, since the aforesaid liquid level sensor in use is elongated, substantial lengths of the sensor will be partially submerged in liquid and substantial lengths of the sensor will be exposed to the air. This results in a problem since regions of the sensor will be affected by multiple temperature coefficients resulting in inaccurate and varying liquid level measurements. These inaccuracies can be substantial, particularly in view of the fact that the lengths of the aforesaid liquid level tape sensors can be very long when suspended in deep wells or storage tanks. Thus temperature variations along the lengths of the sensors in deep wells can be quite substantial resulting in undesirable sensor errors.

SUMMARY OF PREFERRED EMBODIMENT OF THE INVENTION

The aforesaid problem has been substantially obviated by having a passive outer reference closed resistor loop printed by a resistive ink in an elongated fashion along the length of an elongated bottom plastic substrate along with an inner active liquid level sensing closed resistor loop, whereby the passive reference resistor loop is exposed to the same varying temperature conditions as the active level sensing resistor loop (e.g. in half air/half water), thereby providing superior temperature compensation. An upper plastic substrate carries an elongated conductive strip that is positioned over the first and second legs of the inner closed resistor loop, but not over the first and second legs of the outer closed resistor loop and wherein the first and second insulated substrates are coupled together face to face by a coupling member in a manner providing separation of the first and second insulated substrates in the absence of hydrostatic pressure thereon, and for causing conductive bridging contact by the elongated strip of the electrically conductive material contacting the first and second legs of the inner resistive elongated liquid level sensor loop but not contacting the first and second legs of the outer resistive elongated reference loop in the presence of hydrostatic pressure thereon.

Since many of the sensors are very long, e.g. a hundred or more feet positioned within deep wells, the bottom end of the tapes should be free of electrically conductive contact with an electrical member outside of the bottom edge portions of the tapes. That is, lower terminal portions of the inner resistive elongated closed loop and lower terminal portions of the outer resistive elongated closed loop are positioned within a leading bottom portion of the liquid level sensor without being coupled to an electrical contact outside of the leading lower tape portions of the liquid level sensor which is unavailable in the aforesaid deep wells for example, or is otherwise undesirable for shorter tapes in liquid tanks for example.

BRIEF DESCRIPTION OF THE DRAWINGS

Other features and advantages of the invention will become more apparent upon further reading of the specification in conjunction with the drawings in which.

DETAILED DESCRIPTION OF PREFERRED EMBODIMENTS OF THE INVENTION

Figure 1:
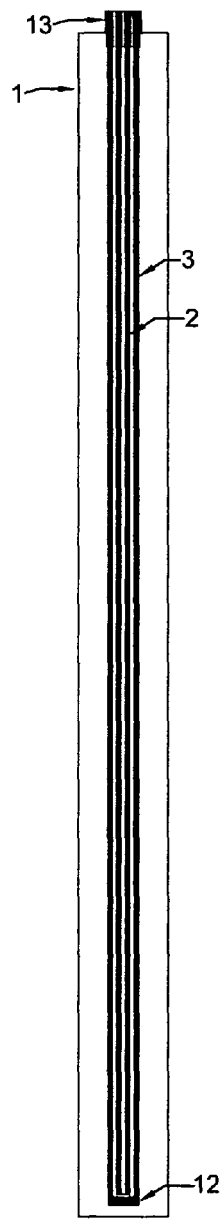
FIG. 1 shows a lower insulated sensor substrate 1 having an inner resistive loop 2 positioned between an outer resistive loop 3.
Figure 5:
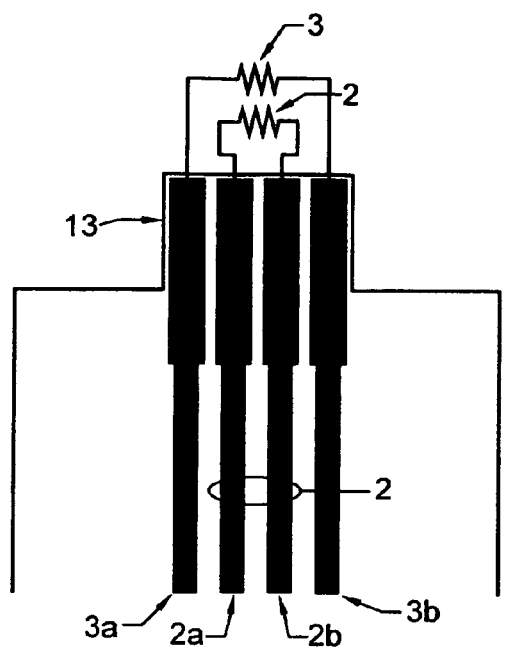
FIG. 5 shows an upper connection of the inner and outer loops to the Wheatstone bridge of FIG. 6.

As shown in FIG. 1, a first lower flexible elongated, insulated plastic substrate 1, has an inner resistive elongated closed loop 2 thereon, the loop having first and second elongated resistive legs 2a and 2b, that are best shown in FIG. 5, and that are formed thereon along the length of the elongated insulated substrate 1, preferably by a printed resistive ink. The inner loop 2 is positioned between first and second elongated legs 3a and 3b of an outer resistive elongated closed loop 3 and is formed upon and along the length of the lower insulated substrate 1 by a printed resistive ink.

Figure 3:
FIG. 3 shows an upper insulated sensor substrate 4 having an elongated conductive layer 4a thereon.

As shown in FIG. 3, a second upper flexible elongated insulated plastic substrate 4 has an elongated strip 4a of an electrically conductive material, that can also be a printer resistive ink, and that is positioned over the first and second resistive legs 2a and 2b of the inner closed resistive loop 2, but not over the first and second resistive legs 3a and 3b of the outer closed resistive loop 3. This is further indicated in the assembled sensor of FIG. 4.

Figure 2:
FIG. 2 shows a spacer layer separating substrates 1 and 4.

The first and second insulated substrates 1 and 4 are coupled together face to face by a coupling member consisting of a spacer layer 5, shown in FIG. 2, in a manner providing separation of the first and second insulated substrates 1 and 4 in the absence of hydrostatic pressure thereon, and for causing conductive bridging contact by the elongated strip 4a of the electrically conductive material contacting the first and second legs 2a and 2b of the inner resistive elongated loop 2, but not contacting the first and second legs 3a and 3b of the outer resistive elongated loop 3, in the presence of hydrostatic pressure thereon.

Figure 4:
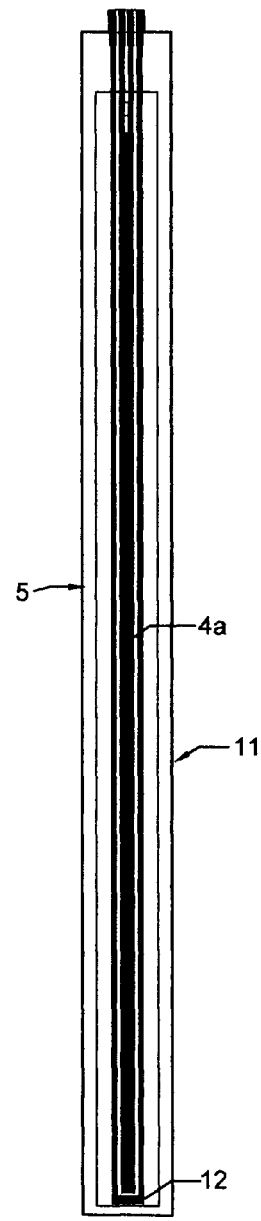
FIG. 4 shows assembled sensor 11.

The assembled sensor component 11 is shown in FIG. 4. Again, note that the inner conductive strip 4a of the upper substrate 4 overlays the inner loop but not the outer loop 3. Thus, spacer layer 5 is the agent for separating the substrates and acts to couple them together. The lower and upper substrates 1 and 4 and the spacer 5 are preferably widely used thermoplastic films in ID cards, laminated together by the application of heat and pressure.

The output of the aforesaid standard Milone hydrostatic thermoplastic tape sensor of my U.S. Pat. No. 7,661,307, incorporated by reference herein, is susceptible to drift as a result of changes in temperature. This is due to the temperature coefficient of resistance of the printed ink which can be as high as 0.75 ohms/F. Accordingly, the temperature compensated tape sensor of the present invention has a printed reference resistor (Rref) loop 3 that is printed on the same bottom sensor substrate 1 to exactly match the resistance loop of the liquid level sensing element loop 2 (Rsense) printed alongside it. However, the resistance of Rref loop 3 is not affected by changes in liquid level since it does not come into contact with the printed elongated conductive bridging strip 4a.

Figure 6:
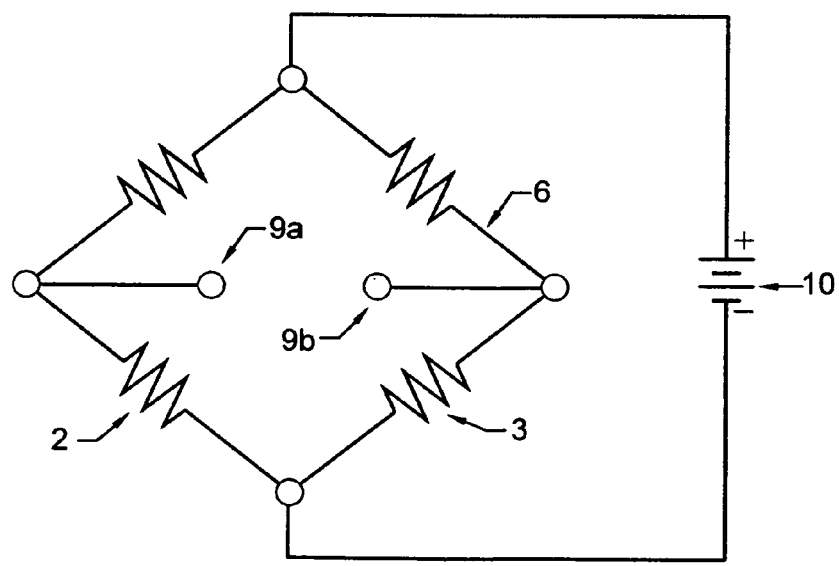
FIG. 6 indicates how the Wheatstone bridge 6 is coupled to the inner and outer resistive loops on the lower substrate of FIG. 1.

When upper portions 13 of the two resistor loops are connected to a Wheatstone bridge as shown in FIGS. 5 and 6, any fluctuation in resistance as a result of changes in temperature are washed out. Alternatively, the two resistor loops could be configured in other analog circuits such as a differential operational amplifier (op-amp) circuit to achieve the same result. In addition, the two resistive loops could be fed into separate analog inputs of a microcontroller such as the Microchip Technologies PIC, Cypress PSoC, Arduino or the like. The analog inputs to the microcontroller can then be converted to digital signals which are then compared to produce the corrected output liquid level signal.

In the Wheatstone bridge example, shown in FIG. 6, in the absence of any liquid reference resistor 3=sensing resistor 2, the output of the bridge is in balance (Vout across terminals 9a and 9b=0 Volts). If the temperature changes, both the resistance of resistor 3 and sensing resistor 2 will change by the same amount keeping the bridge in balance. When a liquid is present, the resistance of sensing resistor 2 decreases linearly with the height of the liquid level due to the bridging action of conductive strip 4a of FIG. 3 which unbalances the bridge, thus providing a variable voltage output across 9a and 9b that is proportional to the level of the liquid. Any changes in resistance as a result in a change in temperature while in the presence of a liquid will also be washed out.

Resistors R1 and R2 and the voltage source 10 shown in FIG. 6 are conventional in Wheatstone bridges. Resistor R1 could be replaced with a potentiometer to zero the bridge, if necessary.

Figure 7:
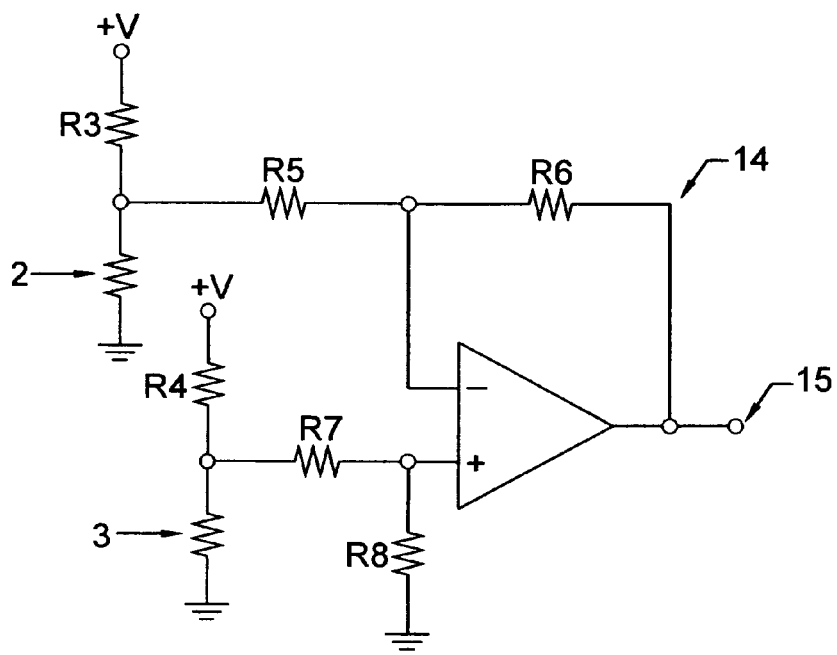
FIG. 7 indicates how an operational amplifier circuit 14 could be coupled to the inner and outer resistive loops on the lower substrate of FIG. 1.

Similarly, in the case of the differential op-amp circuit 14 shown in FIG. 7, in the absence of any liquid, reference resistor 3=sensing resistor 2, and the output of the op-amp is zero (Vout at terminal 15=0 Volts). If the temperature changes, both the resistance of resistor 3 and sensing resistor 2 will change by the same amount keeping the output of the op-amp at zero volts. When a liquid is present, the resistance of sensing resistor 2 decreases linearly with the height of the liquid level due to the bridging action of conductive strip 4a of FIG. 3 which unbalances the op-amp, thus providing a variable voltage output at terminal 14 that is proportional to the level of the liquid. Resistors R3 and R4 shown in FIG. 7 are used to adjust the voltage divider to achieve the desired output voltage range dependant on the supply voltage. Resistors R5 through R8 are conventional in differential op-amps with a typical value of 100K ohms. Resistor R4 could be replaced with a potentiometer to zero the output of the op-amp, if necessary. The analog output of FIGS. 6 and 7 can be converted to a digital format for logging and display on a personal computer and LED or LCD display.

Figure 8:
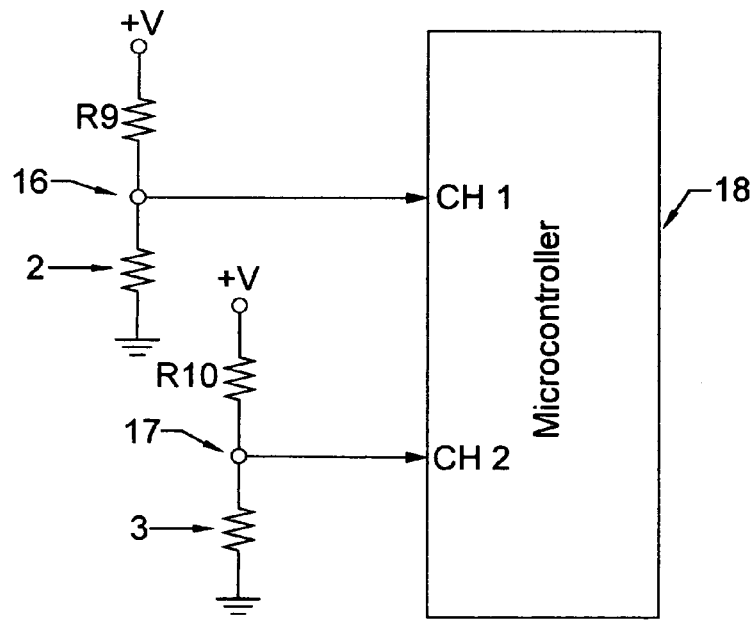
FIG. 8 indicates how individual voltage divider circuits 16 and 17 could be coupled to the inner and outer resistive loops on the lower substrate of FIG. 1 which are then fed into two separate analog inputs of a microcontroller 18.

FIG. 8 shows two voltage divider circuits 16 and 17 which are fed into two separate analog inputs of a microcontroller 18 for comparison of the signals for producing a difference signal indicative of liquid levels sensed including correction of any error introduced by temperature effects. Resistors R9 and R10 shown in FIG. 8 are used to adjust the voltage dividers to achieve the desired output voltage range dependant on the supply voltage. The analog inputs are compared, processed and logged in the microcontroller. The microcontroller can then produce an output signal to display the level on a bank of LEDs, an LCD Display or to a personal computer. Alternatively, the microcontroller can trigger a high or low level alarm or control a pump to maintain the liquid level in a tank, container or vessel.

Thus, FIGS. 6, 7, and 8 describe various forms of a comparator for comparing the resistances of inner and outer loops wherein the difference between the signals produced by the comparator is proportional to the level of the liquid sensed by the liquid level sensor apparatus.

As mentioned previously, and as shown in FIGS. 1 and 4, lower terminal portions of the inner resistive elongated closed loop and lower terminal portions of the outer resistive elongated closed loop are positioned within a leading bottom portion 12 of the liquid level sensor 1 without being coupled to an electrical contact outside of the bottom portion of the liquid level sensor, which electrical ground contact would be unavailable at the bottom of deep wells for example.

While printed restive inks are preferred, traditional non-printing techniques such as chemical etching and vacuum deposition can be utilized to produce the sensor components.

While the invention has been described in connection with preferred embodiments, the description is not intended to limit the scope of the invention to the particular forms set forth, but on the contrary, it is intended to cover such alternatives, modifications, and equivalents as may be included within the spirit and scope of the invention as indicated by the language of the following claims.

I claim:

1. A liquid level sensor component comprising:
   (a) a first elongated, insulated substrate having an inner resistive elongated closed loop having first and second resistive elongated legs formed thereon along the length of said first elongated insulated substrate and positioned between first and second resistive elongated legs of an outer resistive elongated closed loop formed thereon along the length of said first elongated insulated substrate;
   (b) a second elongated insulated substrate having an elongated strip of an electrically conductive material thereon positioned over the first and second resistive elongated legs of the inner resistive elongated closed loop but not over the first and second resistive elongated legs of the outer resistive elongated closed loop; and wherein
   (c) said first and second insulated substrates are coupled together face to face by a coupling member in a manner providing separation of said first and second insulated substrates in the absence of hydrostatic pressure thereon, and for causing conductive bridging contact by said elongated strip of an electrically conductive material contacting the first and second resistive elongated legs of the inner resistive elongated loop, but not contacting the first and second resistive elongated second legs of the outer resistive elongated loop, in the presence of hydrostatic pressure thereon.

2. The sensor of claim 1 wherein lower terminal portions of the inner resistive elongated closed loop and lower terminal portions of the outer resistive elongated closed loop are positioned within a leading bottom portion of the liquid level sensor without being coupled to an electrical contact outside of the bottom portion of the liquid level sensor.

3. The sensor of claim 1 wherein said coupling member comprises a spacer layer having an elongated window therein positioned between said first and second insulated substrates.

4. The sensor of claim 1 wherein the inner and outer resistive elongated closed loops are printable resistive inks.

5. The sensor of claim 4 wherein lower terminal portions of the inner resistive elongated closed loop and lower terminal portions of the outer resistive elongated closed loop are positioned within a leading bottom portion of the liquid level sensor without being coupled to an electrical contact outside of the bottom portion of the liquid level sensor.

6. The sensor of claim 1 wherein the resistivity of the inner closed loop equals the resistivity of the outer closed loop.

7. The sensor of claim 6 wherein lower terminal portions of the inner resistive elongated closed loop and lower terminal portions of the outer resistive elongated closed loop are positioned within a leading bottom portion of the liquid level sensor without being coupled to an electrical contact outside of the bottom portion of the liquid level sensor.

8. The sensor of claim 6 wherein the inner and outer resistive elongated closed loops are printable resistive inks.

9. The sensor of claim 8 wherein said electrically conductive material is a printable resistive ink enabling printing of the same resistive ink upon the first and second insulated substrates, thereby to save manufacturing costs.

10. The sensor of claim 8 wherein lower terminal portions of the inner resistive elongated closed loop and lower terminal portions of the outer resistive elongated closed loop are positioned within a leading bottom portion of the liquid level sensor without being coupled to an electrical contact outside of the bottom portion of the liquid level sensor.

11. A liquid level sensor apparatus comprising:
(a) a first elongated, insulated substrate having an inner resistive elongated closed loop having first and second resistive elongated legs formed thereon along the length of said first elongated insulated substrate and positioned between first and second resistive elongated legs of an outer resistive elongated closed loop formed thereon along the length of said first elongated insulated substrate;
(b) a second elongated insulated substrate having an elongated strip of an electrically conductive material thereon positioned over the first and second resistive elongated legs of the inner resistive elongated closed loop but not over the first and second resistive legs of the outer resistive elongated closed loop; and wherein
(c) said first and second insulated substrates are coupled together face to face by a coupling member in a manner providing separation of said first and second insulated substrates in the absence of hydrostatic pressure thereon, and for causing electrically conductive bridging contact by said elongated strip of an electrically conductive material contacting the first and second resistive elongated legs of the inner resistive elongated loop, but not contacting the first and second resistive elongated legs of the outer resistive elongated loop, in the presence of hydrostatic pressure thereon;
(d) a Wheatstone bridge wherein
(d-1) upper terminal portions of the inner resistive elongated closed loop are positioned within a first lower leg of the Wheatstone bridge; and
(d-2) wherein upper terminal portions of the outer resistive elongated closed loop are positioned within a second lower leg of the Wheatstone bridge.

12. The sensor of claim 11 wherein lower terminal portions of the inner resistive elongated closed loop and lower terminal portions of the outer resistive elongated closed loop are positioned within a leading bottom portion of the liquid level sensor without being coupled to an electrical contact outside of the bottom portion of the liquid level sensor.

13. The sensor of claim 11 wherein said coupling member comprises a spacer layer having an elongated window therein positioned between said first and second insulated substrates.

14. The sensor of claim 11 wherein the inner and outer resistive elongated closed loops are printable resistive inks.

15. The sensor of claim 14 wherein lower terminal portions of the inner resistive elongated closed loop and lower terminal portions of the outer resistive elongated closed loop are positioned within a leading bottom portion of the liquid level sensor without being coupled to an electrical contact outside of the bottom portion of the liquid level sensor.

16. The sensor of claim 11 wherein the resistivity of the inner closed loop equals the resistivity of the outer closed loop.

17. The sensor of claim 16 wherein lower terminal portions of the inner resistive elongated closed loop and lower terminal portions of the outer resistive elongated closed loop are positioned within a leading bottom portion of the liquid level sensor without being coupled to an electrical contact outside of the bottom portion of the liquid level sensor.

18. The sensor of claim 16 wherein the inner and outer resistive elongated closed loops are printable resistive inks.

19. The sensor of claim 18 wherein said electrically conductive material is a printable resistive ink enabling simultaneous printing of the same resistive ink upon the first and second insulated substrates, thereby to save manufacturing costs.

20. The sensor of claim 18 wherein lower terminal portions of the inner resistive elongated closed loop and lower terminal portions of the outer resistive elongated closed loop are positioned within a leading bottom portion of the liquid level sensor without being coupled to an electrical contact outside of the bottom portion of the liquid level sensor.

21. A liquid level sensor apparatus comprising:
(a) a first elongated, insulated substrate having an inner resistive elongated closed loop having first and second resistive elongated legs formed thereon along the length of said first elongated insulated substrate and positioned between first and second resistive elongated legs of an outer resistive elongated closed loop formed thereon along the length of said first elongated insulated substrate;
(b) a second elongated insulated substrate having an elongated strip of an electrically conductive material thereon positioned over the first and second resistive elongated legs of the inner resistive elongated closed loop but not over the first and second resistive legs of the outer resistive elongated closed loop; and wherein
(c) said first and second insulated substrates are coupled together face to face by a coupling member in a manner providing separation of said first and second insulated substrates in the absence of hydrostatic pressure thereon, and for causing electrically conductive bridging contact by said elongated strip of an electrically conductive material contacting the first and second resistive elongated legs of the inner resistive elongated loop, but not contacting the first and second resistive elongated legs of the outer resistive elongated loop, in the presence of hydrostatic pressure thereon; and (d) a comparator for comparing the resistance of the inner elongated closed loop with the resistance of the outer elongated closed loop that produces a difference signal indicative of the level of the liquid sensed by the sensor apparatus.

22. The liquid level sensor apparatus of claim 21 wherein said comparator is selected from the group consisting of a Wheatstone bridge, an operational amplifier, and a pair of voltage divider circuits which are coupled to two separate analog inputs of a microcontroller for comparison of output signals from the voltage divider circuits.

\* \* \* \* \*